(12) United States Patent
Thiel (10) Patent No.: US 12,455,155 B2
(45) Date of Patent: Oct. 28, 2025

(54) TAPE MEASURE WITH DEPLOYABLE STABILIZER

(71) Applicant: Mark Thiel, Woodstock, GA (US)

(72) Inventor: Mark Thiel, Woodstock, GA (US)

( * ) Notice: Subject to any disclaimer, the term of this patent is extended or adjusted under 35 U.S.C. 154(b) by 325 days.

(21) Appl. No.: 18/078,430

(22) Filed: Dec. 9, 2022

(65) Prior Publication Data

US 2023/0184529 A1  Jun. 15, 2023

Related U.S. Application Data

(60) Provisional application No. 63/288,091, filed on Dec. 10, 2021.

(51) Int. Cl.
| | | |
|---|---|---|
| *G01B 3/1046* | (2020.01) | |
| *G01B 3/1005* | (2020.01) | |
| *G01B 3/1056* | (2020.01) | |

(52) U.S. Cl.
CPC ......... *G01B 3/1046* (2020.01); *G01B 3/1005* (2013.01); *G01B 3/1056* (2013.01); *G01B 2003/103* (2013.01)

(58) Field of Classification Search
CPC .. G01B 3/1046; G01B 3/1005; G01B 3/1056; G01B 2003/103; G01B 2003/1074; G01B 3/1071
See application file for complete search history.

(56) References Cited

U.S. PATENT DOCUMENTS

| | | | | |
|---|---|---|---|---|
| 5,782,007 A | * | 7/1998 | Harris | B26B 29/06 33/768 |
| 7,020,978 B1 | * | 4/2006 | Nelson | B43L 7/005 33/759 |
| 7,062,859 B1 | * | 6/2006 | Revnell | B43L 13/20 33/430 |
| 9,366,520 B2 | * | 6/2016 | Puchegger | G01B 7/004 |
| 11,913,780 B2 | * | 2/2024 | Zhang | G01B 3/1071 |
| 12,013,234 B1 | * | 6/2024 | Alba | G01B 3/1071 |
| 2023/0184529 A1 | * | 6/2023 | Thiel | G01B 3/1046 33/770 |
| 2024/0077293 A1 | * | 3/2024 | Jernigan | G01B 3/1003 |
| 2024/0077294 A1 | * | 3/2024 | Struble, III | G01B 3/1003 |
| 2025/0146803 A1 | * | 5/2025 | Thiel | G01B 3/1005 |

FOREIGN PATENT DOCUMENTS

| | | | | | |
|---|---|---|---|---|---|
| CN | 117881939 A | * | 4/2024 | ........... | G01B 3/1003 |
| JP | 3161582 U | * | 8/2010 | | |
| WO | WO-2023028225 A1 | * | 3/2023 | ........... | G01B 3/1003 |

* cited by examiner

*Primary Examiner* — Yaritza Guadalupe-McCall
(74) *Attorney, Agent, or Firm* — John L. Doughty; Doughty Law, L.L.C.

(57) ABSTRACT

A deployable stabilizer cooperates with a tape of a tape measure to stabilize the tape measure with the tape extended therefrom to facilitate hands free stability of the tape measure. The stabilizer may be pivotally coupled with a body of the tape measure to facilitate pivoting between a deployed and a stowed position. The stabilizer may comprise an extendable member that is guided by channels defined by tape measure body. Locations or orientations of pivot holes or channel guides may result in contact of the bottom of the tape in an extended position with a top of the stabilizer in a deployed position to facilitate stability of the tape measure body.

18 Claims, 10 Drawing Sheets

TAPE MEASURE WITH DEPLOYABLE STABILIZER

CROSS REFERENCE TO RELATED APPLICATION

This application claims priority under 35 U.S.C. 119(e) to U.S. provisional patent application No. 63/288,091 entitled "Tape measure body stabilizing device," which was filed Dec. 10, 2021, and which is incorporated herein by reference in its entirety.

SUMMARY

A U-shaped formed device with inside bend at top of each leg. Device can be wire or molded material. The device attaches to handheld retractable tape measure in manner that bottom of U rest under tape when tape is extended for measurement. Inside bends of U attaches to body of tape measure allowing device to pivot forward for tape measure stabilization or to pivot to rear of tape measure for storage or general use.

DETAILED DESCRIPTION

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof. While various components have been illustrated as separate components, it will be appreciated that multiple components can be implemented as a single component, or a single component can be implemented as multiple components, without departing from example embodiments.

An article of manufacture provides additional support for a standard handheld retractable tape measure to increasing stability of the tape measure, thus facilitating tape measure to stand hands-free on a workpiece, such as a piece of lumber, is being measured or marked.

In an embodiment, a formed stabilizer device, apparatus, or article of manufacture, (e.g., wire or molded material) may be shaped as a 'U' with an additional inside bend at top of each leg of the 'U'. The formed stabilizer may be formed to exert inward pressure toward the tape measure to retain the formed 'U' in pivot holes or detents. The stabilizer may removably couple to a handheld retractable tape measure in a manner such that the stabilizer, (e.g., a bottom o a formed 'U') rests under tape when tape is extended forward from the tape measure for measurement. When the tape measure is in use, the extendable tape provides downward pressure on the stabilizer device, thus providing additional points of stabilizations for the handheld tape measure. Inside bends of the formed stabilizer may couple to the body of the tape measure allowing the stabilizer to pivot forward for tape measure stabilization or to pivot to rear of the tape measure for storage, or general use of, the tape measure. The stabilizer can also be removed if needed or designed to be permanently placed on tape measure body. The width of the stabilizer device may extend beyond edges of the tape measure providing further stability.

Figure 1:
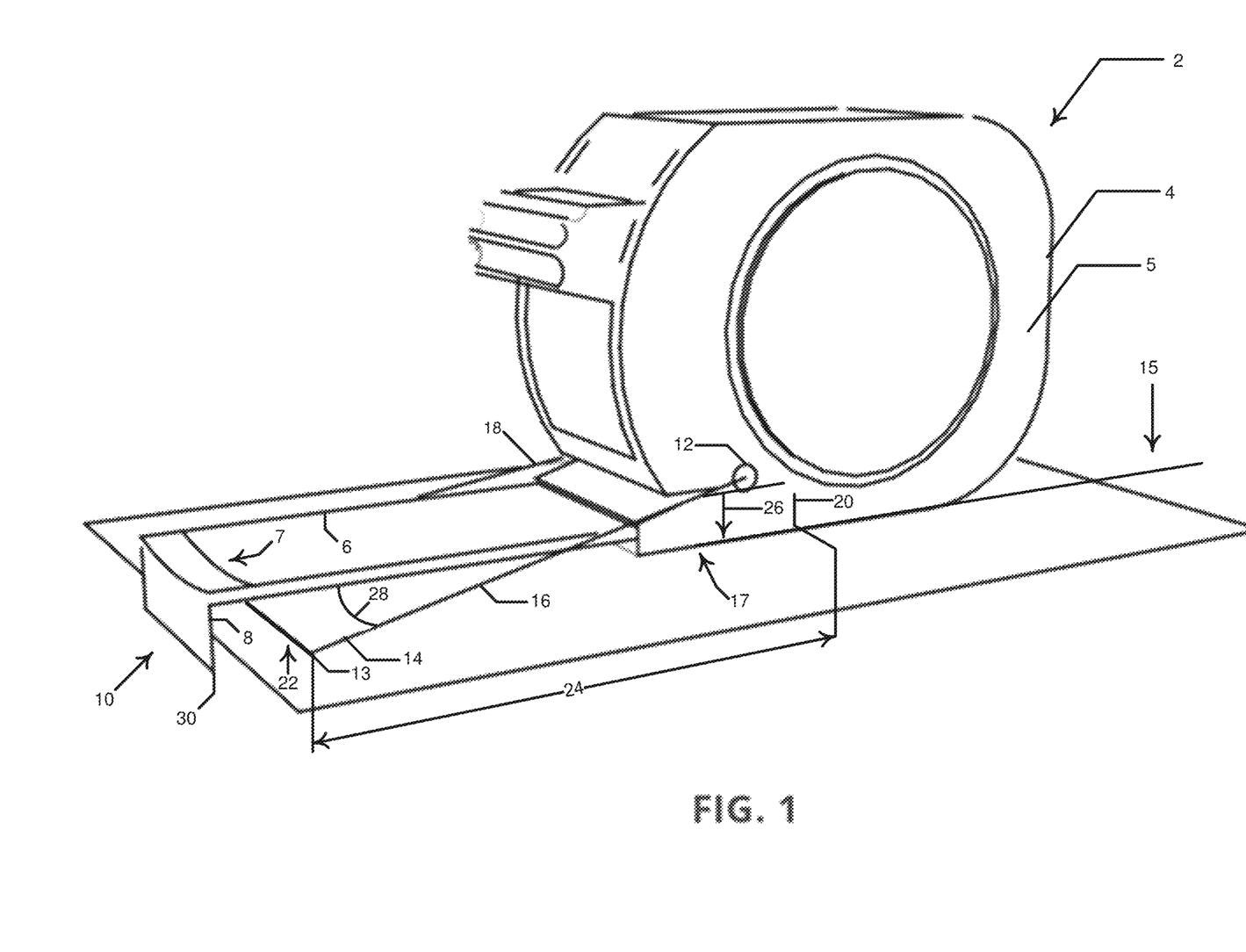
FIG. 1 Illustrates a tape measure with a stabilizer in a deployed position.

Turning now to the figured, FIG. 1 illustrates an example embodiment tape measure 2 having a tape measure body 4. Tape measure 2 may comprise retractable tape 6 and hook 8 at a distal end 10 of tape 6. It will be appreciated that a proximate end of tape 6 may be typically inside a coil of tape 6 disposed in, or enclosed by, tape measure body 4. Tape measure body 4 may define one or more stabilizer guides. As shown in FIG. 1, stabilizer guides are shown as a pivot hole, or pivot holes, 12 (one pivot hole can be seen in the perspective view shown in FIG. 1; another pivot hole may be on the opposite of body 4, which would be facing into the page when looking at the figure). Hole, or holes, 12 may pivotally receive deployable stabilizer bail 14. Bail 14 is shown in a deployed position in FIG. 1. Bail 14 may pivot in pivot holes 12 from a deployed position shown in FIG. 1 to a retracted, stored, or stowed position shown in FIG. 2. As shown in FIG. 4D, stabilizer bail 14 may comprise a bail reference hook 13 formed into the bail at a distal end 22 of the bail. Reference hook 13 may be formed to run across distal end 22 It will be appreciated that other forms of deployable stabilizer may be used instead of a pivotable bail. For example, in an embodiment, a slidable stabilizer, which may be formed in the shape of a 'U' with a first side arm and a second side arm may slide in a guide, such as a channel or groove, formed in the housing, on the outside of the housing 14, or, in an embodiment, on the inside of the housing.

Deployable stabilizer bail 14 may comprise a first side arm 16, which may pivot in hole 12 shown in FIG. 1, and a second arm 18, which may pivot in a hole 12 (not seen in FIG. 1) on a side opposite of side 5, which side 5 can be seen in the figure. Tape 6 may comprise an end hook 8, which may be formed into tape 6, or which may be a separate member from the tape and may be slidably attached, for example, at a distal end 7 of tape 6. End hook 8 may comprise a grip 30, for example a cleat, spike, a barb, grate, a pad, adhesive, a suction cup, or other means for removably securing end 8 to the end of a workpiece, such as, for example, a piece of lumber, a pipe, a tabletop, and the like.

As shown in FIG. 1, with bail 14 in a deployed position, a bottom surface of tape 6 bears against a top surface of bail 14. A location of pivot 12 may be at a pivot hole location distance 26 above a plane 15 parallel with a bottom 17 of housing. Pivot hole location distance 26 above plane 15 may result in stabilizer angle 28 when stabilizer 14 is deployed, for example as shown in FIG. 1. Length of arm 16 or 18 may be formed in deployable stabilizer 14 such that angle 28 falls within a range, such as, for example, five degrees to fifteen degrees, such that downward force acting on tape measure 2 with the tape measure beyond an edge of a workpiece acts on an upper surface of stabilizer 14 thus biasing a bottom edge of the stabilizer onto the workpiece. Other ranges of angle 28, which may be referred to as θ, may comprise 0°<θ<5°, or 15°<θ<45°, or a range that comprises angles greater that forty five degrees. Pivot holes 12 may be located, and stabilizer 14 may be formed of a material having a stabilizer thickness, such that a bottom surface of tape 6 bears against a top surface of the stabilizer or such that angle 28 falls within a range, such as, for example, five degrees to fifteen degrees, or within another range θ mentioned above. With the bottom surface of tape 6 bearing against a top surface of stabilizer 14, a force acting downward on tape measure 2 may biases the stabilizer against a workpiece that tape measure 2 may be resting on.

Lengths of arms 16 or 18 from end 22 to pivot hole(s) 12 may be formed to result in an indication length 24 from end 22 to indicator 20 being a configured length such as, for example, length 24 may be a standard length, for example, 3.5" for a 2×4 board, or in another example length 24 may be a length that is convenient and desirable for measuring a pipe length.

Figure 2:
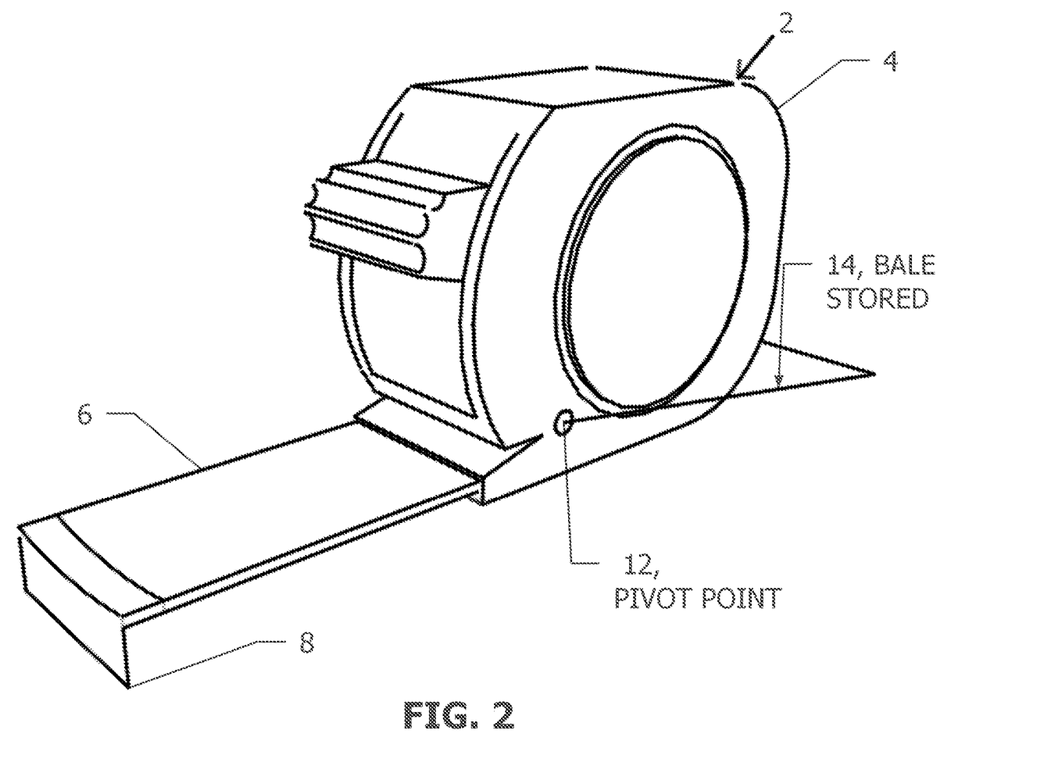
FIG. 2 illustrates a tape measure with a stabilizer in a stowed position.

FIG. 2 shows a stabilizer bale 14 in stored, or stowed, position placing it out of the way for conventional tape measure usage.

Figure 3A:
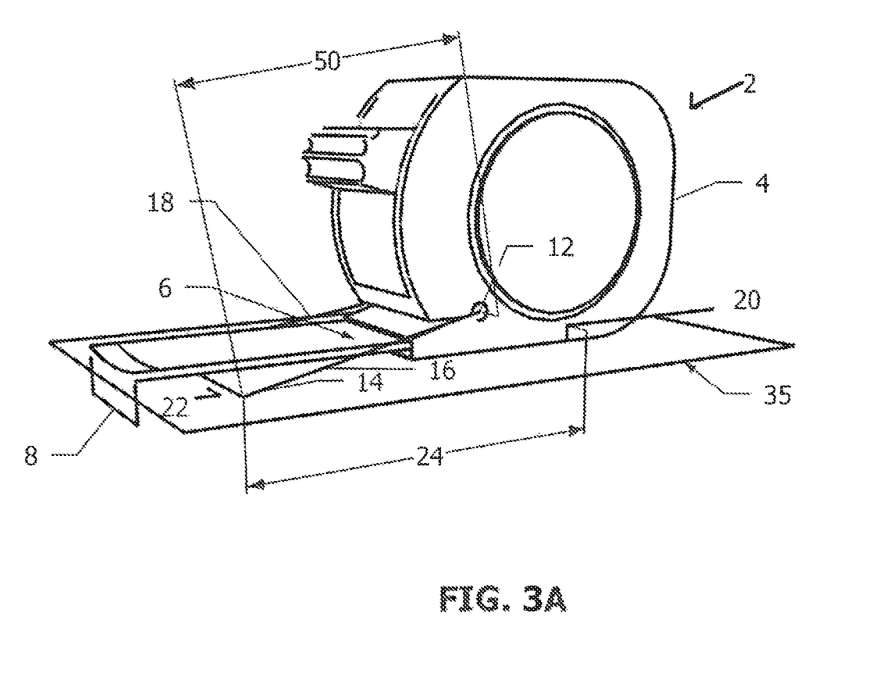
FIG. 3A illustrates a tape measure with a stabilizer deployed and stabilizing the tape measure on a workpiece.

Turning now to FIG. 3A, the figure illustrates stabilizer 14 in a deployed position to stabilize tape measure 2 in cooperation with tip, or hook, 8, in a typical application on a plank or board 35. Tape measure 2 may be stabilized by downward pressure a tape extended from the tape measure causes at stabilization points of stabilizer 14. Stabilization points may comprise one or more points of contact between tape 6 and stabilizer 14 points or one or more points of contact between the stabilizer and a workpiece, such as a plank or a board.

With stabilizer bail 14 deployed as shown in FIG. 3A, force exerted at hook 8 and first and second arms 16 and 18 of the stabilizer bail cooperate to minimize effects of gravity on a center of mass of tape measure 2 that may tend to cause the tape measure to tip over when forces, including gravity and tension exerted on hook 8 via tape 6, are exerted on body 4 of the tape measure.

Tape measure body 4 may comprise indication 20 that indicates a predetermined distance to a distal end 22 of bail stabilizer 14 when the bail is in a deployed position. Thus, tape 6 may not need to be used to measure a standard distance—instead the distal formed end, which may be formed in the shape of a hook 13 (shown in FIG. 4D) of arms 16 or 18 stabilizer 14, may function in place of hook 8, and with the arms of stabilizer 14 being a predetermined length 50 such that indication 20 may be used to measure and mark workpiece 35, such as a board, a predetermined distance 24 (shown in FIG. 1) from distal end 22 (which end of stabilizer 14 may be referred to as a cross bar), to indication 20.

Figure 3B:
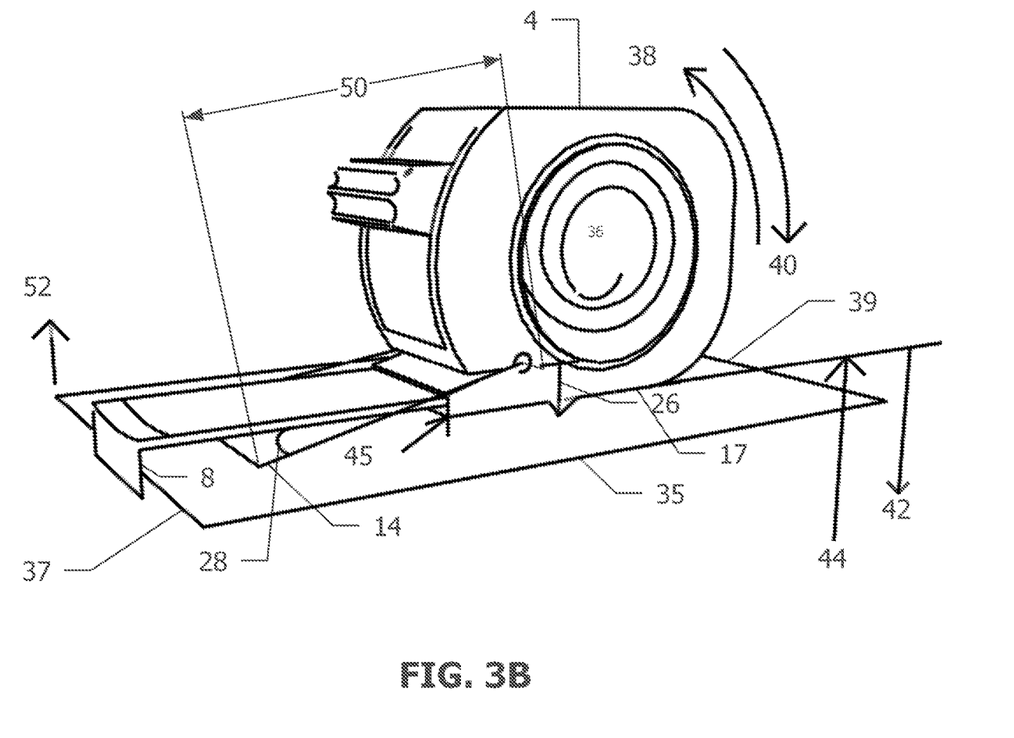
FIG. 3B. illustrates a tape measure with a stabilizer deployed at a stabilizer angle and stabilizing the tape measure.
Figure 3C:
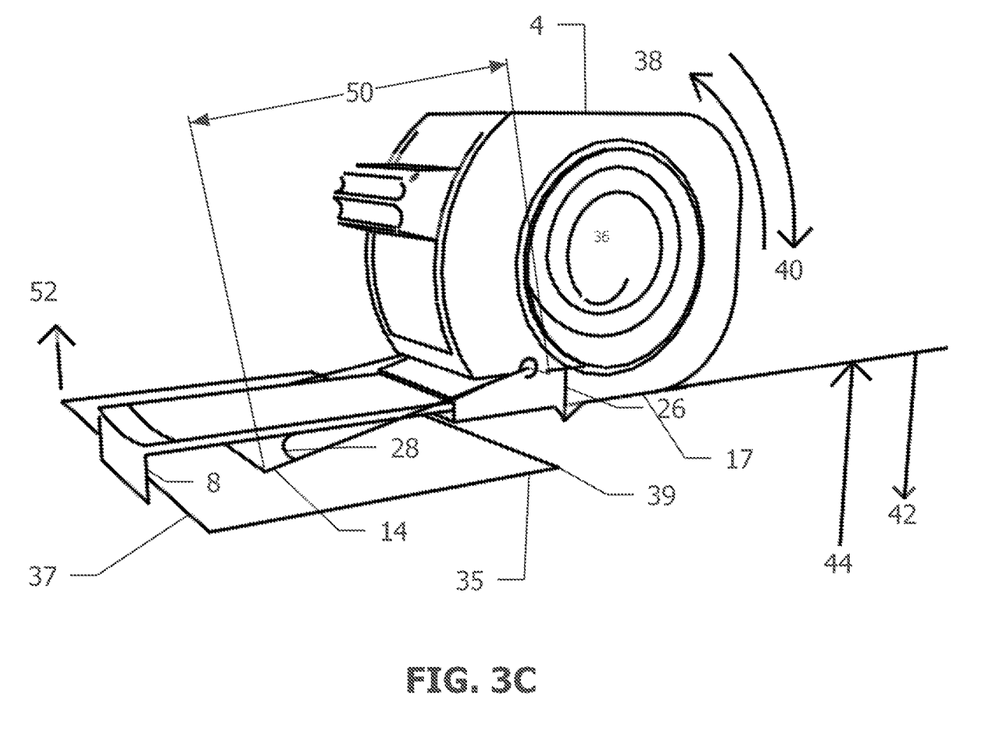
FIG. 3C illustrates a tape measure with a stabilizer deployed and stabilizing the tape measure with the tape measure beyond an end of a workpiece.

A typical tape measure may comprise a locking mechanism. However, sometimes the locking mechanism fails, or a tape measure may not comprise a locking mechanism. FIG. 3B illustrates spring 36 acting on tape 6 with end hook 8 engaged with workpiece 35 at a first end 37. Tape measure 2 may be extended beyond an edge of a second end 39. Spring 36 may exert force that tends to retract tape 6 into housing 4. Spring 36 may also cause force in a rotational direction 38 that is opposed by tape measure 2 with a reactionary force exerted by tape measure 2 in a reactionary direction 40.

Coilable measuring tape 6 may be biased by a force that is opposed by an opposing force exerted by the housing in an opposing force direction 42 wherein the opposing force biases the tape bottom surface against a top, or top surface (surface that cannot be seen in FIG. 3B where bottom of tape 6 contacts stabilizer 14), of stabilizer 14 in an opposing force direction 42 that is opposite a force 44 exerted by a workpiece 35 when the housing bottom surface is in contact with the workpiece. Coilable measuring tape 6 may be biased by a force that is opposed by an opposing force exerted by the housing in an opposing force direction 42 wherein the opposing force biases the tape bottom surface against the a top surface of stabilizer 14 in the opposing force direction with the tape measure beyond a workpiece 35 such that the end hook member exerts a hook force 52 that resists movement of the tape bottom surface away from the workpiece.

Tape measure 2 may define a tape port 45 located such that a tape port bottom is a tape port bottom distance 46 above tape measure body bottom 17. Locating pivot holes 12 a pivot hole distance 26 such that the pivot holes are higher than the bottom of the tape port facilitates stabilizing the tape measure with the bottom of tape 6 contacting, or bearing against, a top surface of stabilizer 14. Thus, a thickness of stabilizer 14 may be selected to result in such optimized contact between the bottom of tape 6 and the top of the stabilizer. It will be appreciated that in the figures, reference to an item being 'higher' than another is made in reference to orientation in the figures. In other words, when viewing the figures, with reference numbers right side up, a location of an item that is shown higher than another in the figure is meant to correspond to references herein to the item being higher than the other.

Figure 4A:
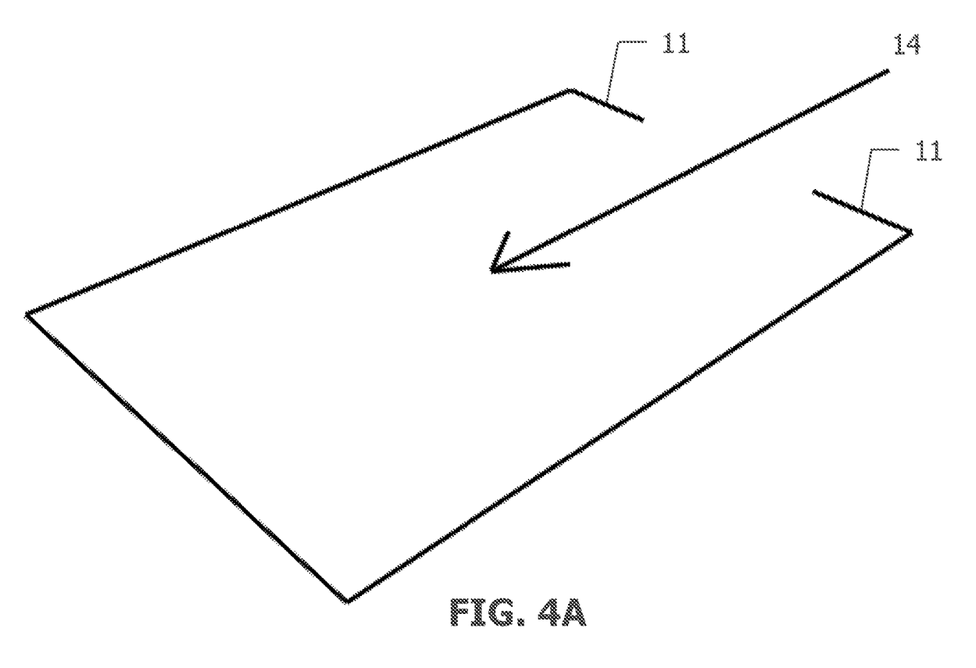
FIG. 4A illustrates a stabilizer with a formed crossbar at a distal end.

FIG. 4A illustrates a stabilizer 14 with stabilizer retainers 11. In an embodiment, stabilizer 14 may be formed form metal wire such that stabilizer retainers 11 comprise a cross section of the rest of stabilizer 14. Stabilizer 14 may pivot between a deployed and stowed position on retainers 11 inserted into guides, or pivot holes, formed in the side of a housing of a tape measure. In an embodiment, stabilizer retainers 11 may be formed to slide within a guide, such as a channel or a slot, which a housing of a tape measure my define on the inside of the housing or on the outside of the housing. Stabilize 14 may retractably slide between a deployed position and a stowed position on the stabilizer's retainers 11 sliding in the channels of guides. Guides, whether pivot holes or channels/slots, or another formed style, or technique, of movably attaching a stabilizer 14 to a tape measure may be defined such that in a deployed position the stabilizer forms an angle relative to a plane parallel to the bottom of the tape measure or such that the bottom of a tape extended from the tape measure contacts a top or the stabilizer when in a deployed position.

Figure 4B:
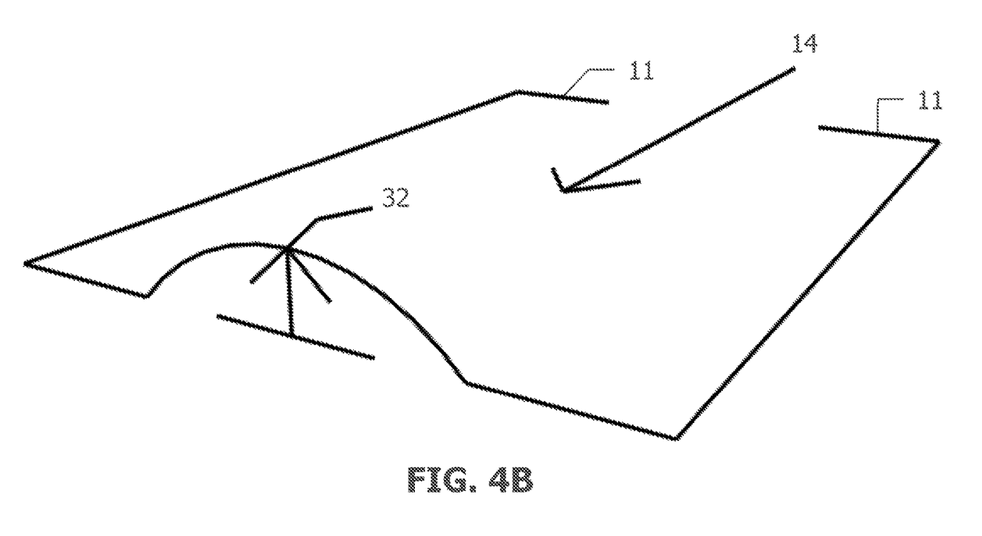
FIG. 4B illustrates a stabilizer with an arched formed in a formed crossbar.

FIG. 4B illustrates an embodiment of a bail 14 having arch 32. Arch 32 may facilitate the previously-mentioned bearing of the bottom of tape 6 against stabilizer 14. For example, a tape measure may typically have a distance between a bottom of tape port 45 shown in FIG. 3B and a bottom 17 of housing 4 of about 0.125". If a tape measure has a larger distance than, for example, 0.125", between the bottom of tape port 45 and the bottom 15 of housing 4, arch 32 may facilitate the bottom of tape 6 contacting, or bearing against, stabilizer 14 without having a thickness of stabilizer 14 being more than if the distance between the bottom of that tape port and the bottom of the tape measure housing were 0.125".

Figure 4C:
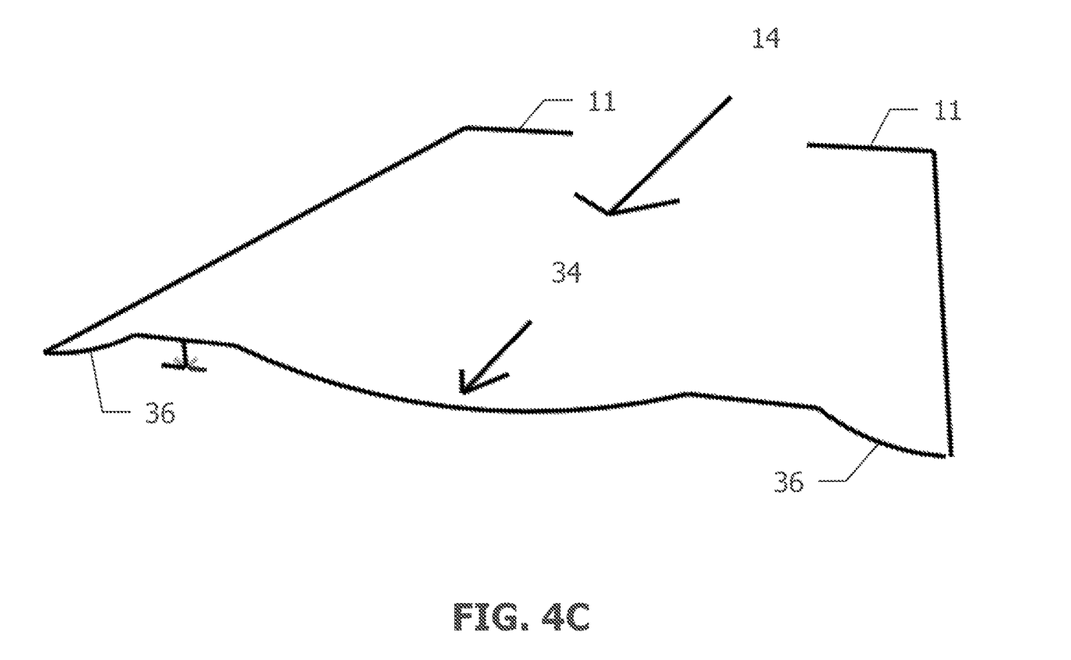
FIG. 4C illustrates a stabilizer with a saddle formed in a formed crossbar.
Figure 4D:
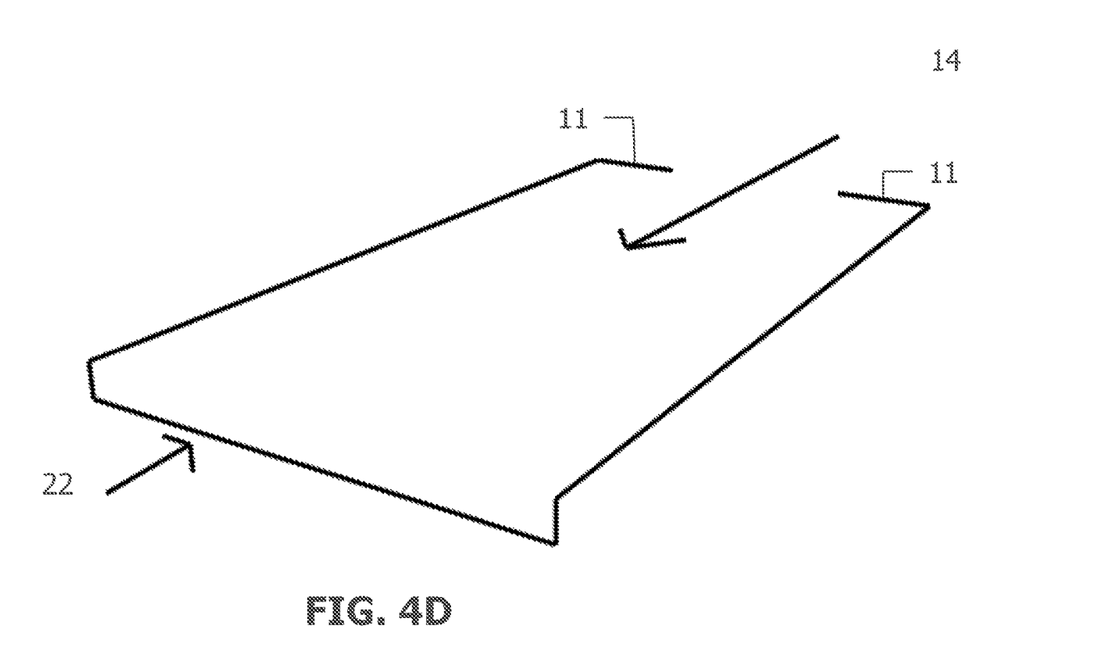
FIG. 4D illustrates a stabilizer with a hook formed in a distal end.

In another embodiment shown in FIG. 4C, stabilizer 14 may comprise saddle 34 that may have a curvature that substantially correspond to a curvature of the bottom of tape 6 to increase contact between the stabilizer and the bottom of the tape with the stabilizer deployed and with the tape extended beyond the distal end of the tape. To facilitate stability, stabilizer 14 may comprise, in addition to saddle 34, one or more stabilizer shoulders 36.

Figure 4E:
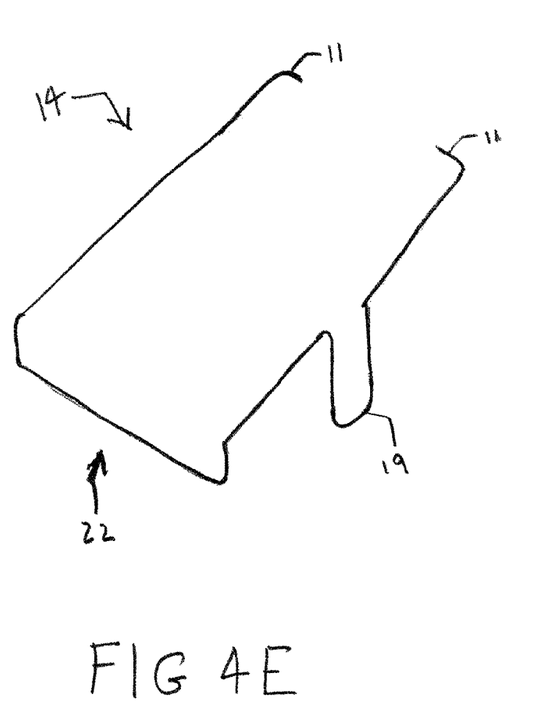
FIG. 4E illustrates a stabilizer with a restraining projection formed into a side leg of the stabilizer.

In another embodiment shown in FIG. 4E As shown in FIG. 4E, side leg 16 may define a restraining projection 19, which may comprise a loop or other shape formed into the side leg. With bail 14 in a deployed position, restraining projection 19 may restrain tape measure 2 from moving toward distal end 7 when end hook 8 is hooked to a first end of a workpiece and the tape measure is located beyond a second end of the workpiece, such as, for example, an second edge at the second end of a board that is parallel to, and at a opposite end of, a first edge at the first end of the board. Restraining projection 19 may restrain spring force exerted on tape 6 (e.g., if the tape is unlocked or not lockable) from pulling tape measure 2 onto the top of the board.

What is claimed is:

1. A tape measure, comprising:
a body defining at least one stabilizer guide;
a deployable stabilizer coupled to the body via the at least one stabilizer guide, wherein the at least one stabilizer guide comprises at least one pivot hole, and wherein the deployable stabilizer comprises a bail pivotally coupled to the body via the at least one pivot hole; and
a retractable tape having a longitudinally formed curvature;
wherein the deployable stabilizer comprises a distal end that defines a saddle that cooperates with the longitudinally formed curvature to resist rotation of the tape or rotation of the body with respect to an axis that is parallel to a longitudinal direction of the tape when the tape is extended from the body.

2. The tape measure of claim 1, wherein the at least one stabilizer guide comprises at least one projection groove.

3. The tape measure of claim 2, wherein the deployable stabilizer comprises a tongue slidably coupled to the body via the at least one projection groove, wherein the tongue stabilizer slides toward the body to a retracted position and slides away from the body to a deployed position.

4. The tape measure of claim 1, wherein at least a first arm of the bail is formed to one of at least one determined length that corresponds to a determined distance to a reference mark of the body when the retractable stabilizer is in a deployed position.

5. The tape measure of claim 1, wherein the distal end of the deployable stabilizer further defines at least one stabilizer corner.

6. The tape measure of claim 1, wherein the retractable stabilizer comprises a distal end that defines an arch that bears against a bottom surface of the tape with the tape extended from the body and with the deployable stabilizer in a deployed position.

7. The tape measure of claim 1,
wherein the body comprises a body bottom surface, wherein the deployable stabilizer has a stabilizer thickness and a stabilizer top surface, wherein the retractable tape has a tape bottom surface, and wherein the body defines the at least one stabilizer guide such that the tape bottom surface contacts the stabilizer top surface with the deployable stabilizer is in a deployed position.

8. The tape measure of claim 7, wherein the body defines the at least one guide in a guide orientation such that the deployable stabilizer forms a stabilizer angle relative to the body bottom surface.

9. The tape measure of claim 1,
wherein the retractable tape comprises a distal end, wherein the retractable tape is biased toward a retracted position and wherein the distal end comprises a hook;
wherein the body comprises a body bottom surface, and wherein the deployable stabilizer defines a restraining arm such that the restraining arm resists the bias of the retractable tape toward the retracted position with the hook engaged at a first edge of a workpiece and the restraining arm engaged with a second edge of the workpiece.

10. A tape measure, comprising:
a housing having a housing bottom surface, the housing defining an internal cavity, a tape port formed in the housing adjacent the housing bottom surface, and at least one stabilizer guide having a stabilizer guide orientation;
a coilable measuring tape at least partially disposed within the housing and having a distal end extendable out of the housing through the tape port; wherein the distal end of the coilable measuring tape comprises an end hook member; and
a deployable stabilizer coupled to the housing via the at least one stabilizer guide, the deployable stabilizer comprising a distal end;
wherein the deployable stabilizer has a stabilizer thickness, a stabilizer top surface, and a stabilizer bottom surface, wherein the coilable measuring tape has a tape bottom surface, and wherein the body defines the at least one stabilizer guide orientation such that the tape bottom surface contacts the stabilizer top surface with the deployable stabilizer in a deployed position and with the distal end of the coilable measuring tape extended out of the housing through the tape port beyond the distal end of the deployable stabilizer, with the end hook member engaged with an edge of a workpiece and with the stabilizer bottom surface in contact with the workpiece.

11. The tape measure of claim 10, wherein the coilable measuring tape is biased by a force that is opposed by an opposing force exerted by the housing in an opposing force direction;
wherein the opposing force biases the tape bottom surface against the stabilizer top surface in the opposing force direction with the housing bottom surface in contact with the workpiece.

12. The tape measure of claim 11, wherein the stabilizer guide orientation results in a stabilizer angle between the deployable stabilizer and the housing bottom surface with the deployable stabilizer in the deployed position.

13. The tape measure of claim 10, wherein the coilable measuring tape is biased by a force that is opposed by an opposing force exerted by the housing in an opposing force direction;

wherein the opposing force biases the tape bottom surface against the stabilizer top surface in the opposing force direction with the tape measure beyond the workpiece such that the end hook member exerts a hook force that resists movement of the tape bottom surface away from the workpiece.

14. The tape measure of claim 13, wherein the end hook member defines at least one grip to increase resistance of movement of the tape bottom surface away from the workpiece.

15. The tape measure of claim 10, wherein the at least one stabilizer guide comprises at least one pivot hole.

16. A tape measure, comprising:

a housing having a housing bottom, the housing defining an internal cavity, the body defining a tape port having a tape port bottom being at tape port bottom distance above the housing bottom, and the body defining at least one pivot hole at a pivot hole location distance above the housing bottom;

a tape at least partially disposed within the housing and having a distal end extendable out of the housing through the tape port; wherein the distal end of the tape comprises an end hook; and a deployable stabilizer coupled to the housing via the at least one pivot hole, the deployable stabilizer comprising a distal end;

wherein the deployable stabilizer has a stabilizer thickness, a stabilizer top surface, and a stabilizer bottom surface; wherein the tape has a tape bottom surface; and wherein the body defines the at least one stabilizer pivot hole at a pivot hole location such that the tape bottom surface contacts the stabilizer top surface with the deployable stabilizer in a deployed position and with the distal end of the tape extended out of the housing through the tape port beyond the distal end of the deployable stabilizer.

17. The tape measure of claim 16, wherein, with the deployable stabilizer in the deployed position, a stabilizer angle exists between the stabilizer and a plane parallel to the housing bottom, wherein the pivot hole location distance above the housing bottom is a greater distance than the tape port bottom distance above the housing bottom.

18. The tape measure of claim 17, wherein the stabilizer bottom surface has a stabilizer bottom surface position that is higher than the housing bottom.

\* \* \* \* \*